(12) United States Patent
Ducimetiere et al.

(10) Patent No.: US 10,578,512 B2
(45) Date of Patent: Mar. 3, 2020

(54) LEAK DETECTOR AND METHOD FOR DETECTING LEAKS

(71) Applicant: PFEIFFER VACUUM, Annecy (FR)

(72) Inventors: Laurent Ducimetiere, Annecy (FR); Michel Puech, Metz-Tessy (FR); Frederic Rouveyre, Chavanod (FR)

(73) Assignee: PFEIFFER VACUUM, Annecy (FR)

( * ) Notice: Subject to any disclaimer, the term of this patent is extended or adjusted under 35 U.S.C. 154(b) by 0 days.

(21) Appl. No.: 15/560,379

(22) PCT Filed: Mar. 7, 2016

(86) PCT No.: PCT/EP2016/054808
§ 371 (c)(1),
(2) Date: Sep. 21, 2017

(87) PCT Pub. No.: WO2016/150690
PCT Pub. Date: Sep. 29, 2016

(65) Prior Publication Data
US 2018/0073955 A1     Mar. 15, 2018

(30) Foreign Application Priority Data
Mar. 23, 2015 (FR) ..................... 15 52371

(51) Int. Cl.
*G01M 3/20* (2006.01)
(52) U.S. Cl.
CPC ..................... *G01M 3/20* (2013.01)
(58) Field of Classification Search
CPC ....................................... G01M 3/20
See application file for complete search history.

(56) References Cited

U.S. PATENT DOCUMENTS

| | | | | |
|---|---|---|---|---|
| 5,661,229 A | * | 8/1997 | Bohm | G01M 3/202 315/111.91 |
| 2012/0255899 A1 | * | 10/2012 | Choi | B01D 53/228 210/489 |
| 2014/0154811 A1 | * | 6/2014 | Sjong | G01N 33/0016 436/72 |

OTHER PUBLICATIONS

International Search Report dated May 19, 2016 in PCT/EP2016/054808 filed Mar. 7, 2016.

(Continued)

*Primary Examiner* — Xin Y Zhong
(74) *Attorney, Agent, or Firm* — Oblon, McClelland, Maier & Neustadt, L.L.P.

(57) ABSTRACT

A leak detector for detection of leaks from an object to be tested by detection of a tracer gas, the leak detector including: an inlet of gases; a pumping device; a pumping line connecting the inlet of the gases to the pumping device; a device for detection of tracer gas fitted to the pumping line, as bypass of the pumping device, the device for detection of tracer gas including a probe configured to ionize the gas molecules and to measure current of the ionized gas molecules, and a separating membrane arranged upstream of the probe. The separating membrane is a monoatomic layer of graphene deposited on a gas-permeable substrate of the device for detection of tracer gas including selection orifices, the greatest dimension of which is less than 5 angstroms, made in the monoatomic layer of graphene.

11 Claims, 3 Drawing Sheets

(56) References Cited

OTHER PUBLICATIONS

Figure 1:
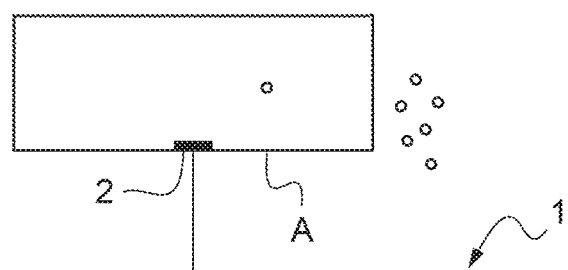

Combined Chinese Office Action and Search Report dated Mar. 19, 2019 in corresponding Chinese Patent Application No. 201680025697.5 (with English Translation), 12 pages.
Second Chinese Office Action with English translation dated Oct. 12, 2019 in corresponding Chinese Patent Application No. 201680025697.5 (12 pages).

* cited by examiner

LEAK DETECTOR AND METHOD FOR DETECTING LEAKS

The present invention relates to a leak detector for monitoring the leaktightness of an object to be tested by means of a tracer gas. The present invention also relates to a method for detecting leaks.

A known method for monitoring the leaktightness of an object consists in carrying out a test by a tracer gas. This method involves the detection of the passage of the tracer gas through the possible leaks of the object to be tested.

According to a first method, the object to be tested is filled with the tracer gas. The possible presence of the tracer gas around the object is then sought using a leak detector. The object can be placed in a leaktight test chamber placed under vacuum. Alternatively, the measurement can be carried out at atmospheric pressure and, in this case, a "sniffing" leak detector is used.

According to another known method, "by spraying", the vacuum is produced in the object to be tested and an atmosphere enriched in tracer gas is created around the object to be tested. The inside of the object to be tested is connected to a leak detector which confirms whether tracer gas can be found in the gases sucked out.

Use is generally made of helium as tracer gas as it passes through the small leaks more easily than other gases, as a result of the small size of its molecule.

Use is also generally made of a mass spectrometer for detecting and identifying the helium in the gas stream withdrawn. The gas molecules are ionized and then separated as a function of their mass/charge ratio. The ionic current is collected and converted into electric current. This detection method is highly sensitive. It is generally used for the detection of leaks ranging from $10^{-5}$ to $10^{-12}$ Pa·m$^3$/s.

However, this method is expensive. The cost is due in particular to the need to obtain and maintain an ultrahigh vacuum by a turbomolecular pump, which makes possible the operation of the mass spectrometer. Furthermore, the turbomolecular pump renders the leak detector bulky and not very mobile. This is because the very high rotational speed and the inertia of the rotor of the turbomolecular pump mean that the user has to wait a certain time after having ordered the halting of the ultrahigh-vacuum pump in order for the halting of, the rotor to be effective and in order for it to be possible to move the leak detector without risk of damaging it. Hasty shifting of the system might cause the ultrahigh-vacuum pump to jam as a result of the gyroscopic effect.

Other leak detection methods using neither ultrahigh-vacuum pumping nor mass spectrometry are known.

The document U.S. Pat. No. 5,661,229, for example, discloses a leak detector, the inlet of which is connected to a test chamber. A line connects the inlet to a vacuum pump. The gases to be tested pass into the line, where they are seen by a gas detector. The gas detector comprises a membrane which is permeable to the test gas. This membrane can be made of polymer material, of quartz or of silica. The quartz or silica membrane has to be heated to between 300 and 900° C. in order to be rendered permeable to the test gas while having a satisfactory permeation rate. This requires the implementation and the management of a sophisticated heating device for the membrane, which is complex to produce and to monitor and which is energy-consuming.

Likewise, once the leaktightness has been monitored, it is necessary to heat the membrane in order to discharge the trapped test gas in order to be able to proceed to a fresh measurement without the residual test gas from the preceding measurement distorting a subsequent measurement.

In addition, the diffusion of the test gases through the membrane is an operation which takes time, even when the membrane is heated. This results in a relatively long response time for carrying out a leaktightness measurement.

One of the aims of the present invention is to provide a leak detection device which is robust, compact, easy to handle and relatively inexpensive, which consumes relatively little energy and which exhibits a shorter response time than the devices of the prior art.

To this end, a subject-matter of the invention is a leak detector for the detection of leaks from an object to be tested by detection of a tracer gas, the leak detector comprising:
  an inlet of the gases,
  a pumping device,
  a pumping line connecting the inlet of the gases to the pumping device,
  a device for detection of tracer gas fitted to the pumping line, as bypass of the pumping device, the device for detection of tracer gas comprising:
    a probe configured in order to ionize the gas molecules and to measure the current of the ionized gas molecules, and
    a separating membrane arranged upstream of the probe,
  characterized in that the separating membrane is a monoatomic layer of graphene deposited on a gas-permeable substrate of the device for detection of tracer gas, selection orifices, the greatest dimension of which is less than 5 angstroms, being made in the monoatomic layer of graphene so that only the gas molecules having smaller dimensions than the selection orifices can pass through the separating membrane to reach the probe.

Thus perforated, the monoatomic layer of graphene becomes mechanically permeable to the molecules passing through the selection orifices. The dimensions of the selection orifices make it possible for only the molecules of the tracer gas which it is desired to detect in the object to be tested or around the object to be tested to pass through the separating membrane. The passage of the molecules of other gases, such as nitrogen or oxygen of the air, is blocked. The pressure downstream of the separating membrane is then a low ultrahigh-vacuum pressure, that is to say a high vacuum, for example of between, $10^{-3}$ and $10^{-7}$ mbar, such as less than $10^{-5}$ mbar. This ultrahigh vacuum makes possible the operation of the probe which ionizes the gas molecules.

As the thickness of the separating membrane constituted by the monoatomic layer of graphene is of the order of a few angstroms, the thickness is decreased by a factor of 1000 to 10 000 with respect to the thickness of the membranes of the state of the art made of polymer or of silica. The tracer gas thus passes through the separating membrane virtually instantaneously, so that the response time is much faster than that of the membranes of the prior art.

As the permeation of the separating membrane formed by the monoatomic layer of graphene is mechanical, this does not have to be heated in order to allow the passage of the helium, which is simple to set up and is economical in terms of energy.

According to one or more characteristics of the leak detector, taken alone or in combination,
  the greatest dimension of the election orifices is less than 3 angstroms,
  the density of the selection orifices is between $4.10^{15}$ and $4.10^{18}$ cm$^{-2}$,
  the monoatomic layer of graphene, exhibits a surface area of between 0.5 and 2 cm$^2$, the gas-permeable substrate comprises a material having through-pores, the smallest dimension of a through-pore section being greater than 30 angstroms, the thickness of the gas-permeable substrate is between 1 and 100 μm, the probe comprises an ionization gauge or an ion pump, the leak detector comprises a sniffing probe connected to the inlet of the gases.

Another subject-matter of the invention is a method for detecting leaks for the detection of leaks from an object to be tested by detection of a tracer gas, by means of a leak detector as described above, in which:

a gas stream moving from an inlet of the gases towards a pumping device, for which it is desired to detect whether it contains tracer gas in the event of leaks from the object to be tested, is brought into communication with a separating membrane of monoatomic layer of graphene deposited on a gas-permeable substrate, the monoatomic layer of graphene being pierced with selection orifices, allowing the passage only of the gas molecules, the dimensions of which are less than the greatest dimensions of the selection orifices of the monoatomic layer of graphene, and blocking the passage of the other gases.

The gases which have passed through the separating membrane can subsequently be ionized in order to generate a current representative of the leakage rate of the object to be tested.

Figure 2:
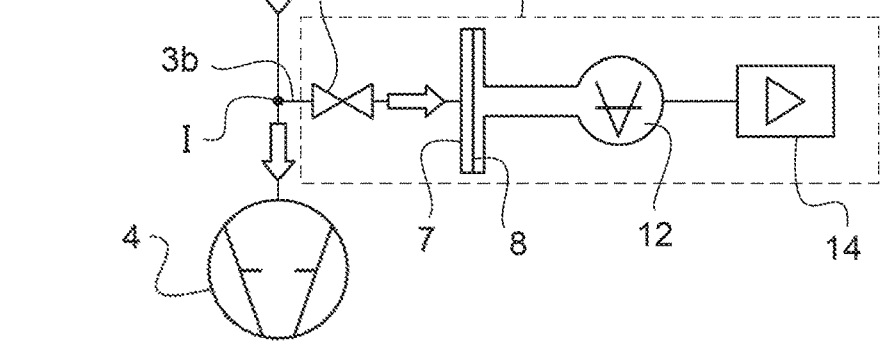
Figure 3:
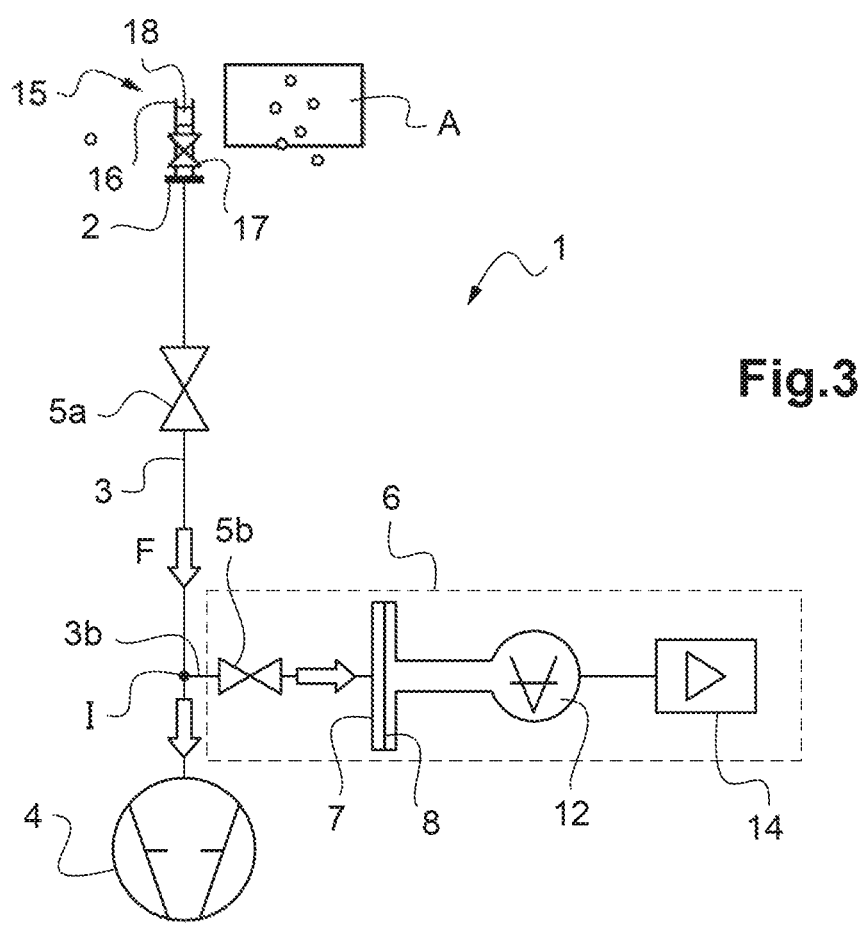
Figure 4:
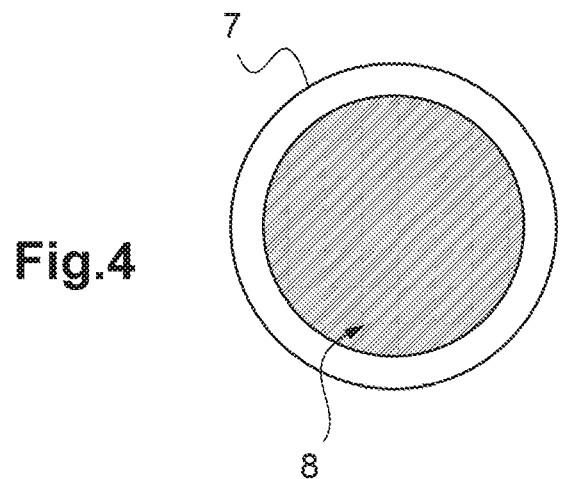
Figure 5:
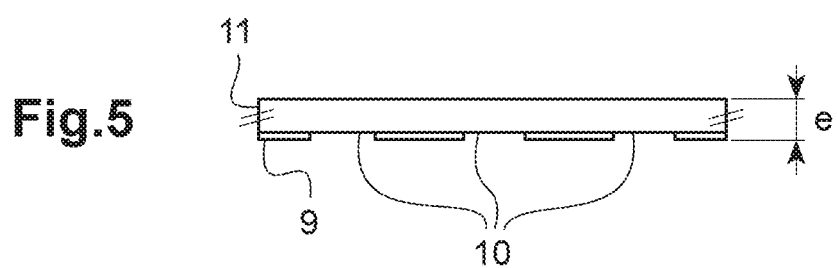
Figure 6:
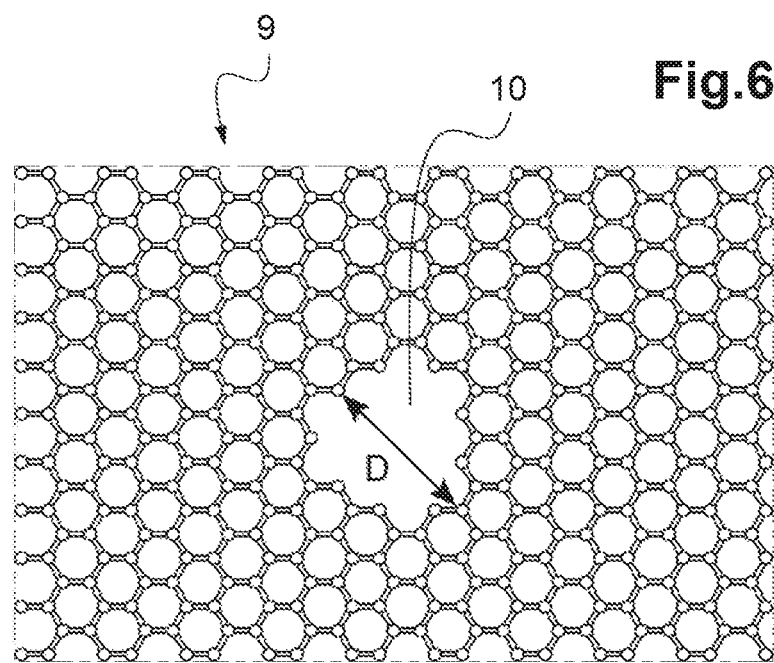

Other characteristics and advantages of the invention will become apparent from the following description, which is given by way of example and is non-limiting, in the light of the appended drawings, in which:

FIG. 1 represents a diagrammatic view of elements of a leak detector connected to an object to be tested, illustrating a first example of a method for detecting leaks, FIG. 2 is a view similar to FIG. 1, in which the leak detector is connected to a leaktight chamber, in order to illustrate a second example of a method for detecting leaks, FIG. 3 is a view similar to FIG. 1, in which the leak detector comprises a sniffing probe, in order to illustrate a third example of a method for detecting leaks, FIG. 4 represents a front diagrammatic view of elements of the device for detection of tracer gas, FIG. 5 is a side view of a detail of the separating membrane and of a gas-permeable substrate, and FIG. 6 represents a diagrammatic view of a detail of the monoatomic layer of graphene.

In these figures, the identical elements carry the same reference numbers. The following implementations are examples. Although the description refers to one or more embodiments, this does not necessarily mean that each reference relates to the same embodiment or that the characteristics apply only to just one embodiment. Simple characteristics of different embodiments can also be combined to provide other implementations.

In the rest of the description, the terms "upstream" and "downstream" will be used with reference to the direction of flow of the gases in the leak detector.

FIG. 1 shows a diagrammatic representation of an exemplary embodiment of a leak detector 1 for the detection of leaks from an object to be tested A by detection of a tracer gas.

The detection of leaks from an object to be tested A by detection of a tracer gas is carried out by detecting the passage of a tracer gas through the possible leaks from the object to be tested A.

According to a first method, "by spraying", represented in FIG. 1, an atmosphere enriched in tracer gas is created around the object to be tested A. The inside of the object to be tested A is connected to the leak detector 1, which checks whether tracer gas can be found in the object A.

According to another method represented in FIG. 2, the object to be tested A is filled with the tracer gas and is placed in a leaktight test chamber C put under vacuum. The possible presence of the tracer gas in the test chamber C is sought using the leak detector 1.

According to another method represented in FIG. 3, "of sniffing", the leak detector 1 is equipped with a sniffing probe 15. The object to be tested A is filled with tracer gas, which is generally pressurized, and the possible presence of the tracer gas is sought by trailing the sniffing probe 15 around the object to be tested A.

Use is generally made of helium or hydrogen as tracer gas as these gases pass through the small leaks more easily than other gases, as a result of the small size of their molecules.

The leak detector 1 comprises an inlet 2 of the gases, a pumping device 4, a pumping line 3 connecting the inlet 2 of the gases to the pumping device 4, and a device 6 for detection of tracer gas.

As mentioned above, the inlet 2 of the gases is intended to be connected to an object to be tested A or to a test chamber C, in which the object to be tested A has been arranged, or to a sniffing probe 15.

The pumping line 3 fluidically connects the inlet 2 of the gases to the pumping device 4 so as to cause a gas stream F to move from the inlet 2 of the gases towards the pumping device 4.

In the "sniffing" leak detection method illustrated in FIG. 3, the inlet 2 of the gases of the leak detector 1 is connected to a sniffing probe 15.

In a way known per se, the sniffing probe 15 comprises a pipe 16 emerging in the external atmosphere. A predefined conductance 17 and at least one filter 18 are fitted in series in the pipe 16.

The predefined conductance 17 is configured in order to limit the gas flow sucked up by the pumping device 4. The predefined conductance 17 is, for example, produced by a capillary, a nozzle, such as a drilled ruby, or a porous membrane or a needle.

The fitter 18 filters the rust which may originate from the external atmosphere, thus making it possible to prevent the pipe 16 from becoming blocked, it is possible to provide several filters in series, upstream of the predefined conductance 17, such as a first filter made of sintered metal, for the dust between 10 and 20 μm, and a second filter based on felt fibres, for finer dust, for example between 5 and 10 μm.

In addition, provision is made, for the sniffing leak detector 1, for the pumping line 3 to be flexible, in order to allow the user to locate the leaks.

The pumping device 4 comprises, for example, a low-vacuum pump, such as a membrane pump, which sucks out the gases and expels them at atmospheric pressure at the outlet of the low-vacuum pump. The low-vacuum pump makes it possible to obtain a low low-vacuum pressure, that is to say a rough vacuum of a few millibars, for example of between 1 and 1000 mbar, such as less than 10 mbar (or 1000 Pa). This rough vacuum is obtained with a low-vacuum pump which is compact and inexpensive, as a result of the small pumping rates required, for example ranging from 0.25 m$^3$/h to 4.3 m$^3$/h. A pumping device 4 comprising only a single small membrane pump is sufficient for a sniffing leak detector 1.

The device 6 for detection of tracer gas is fitted to the pumping line 3 as bypass of the pumping device 4 at an intersection I of the pumping line 3.

The leak detector 1 can comprise a first isolation valve 5a fitted to the pumping line 3 between the inlet 2 of the gases and the bypass I. The first isolation valve 5a makes it possible to isolate the inlet 2 of the gases in order to make it possible, for example, to connect the object to be tested A to the inlet 2 of the gases of the leak detector 1 while maintaining the vacuum in the pumping line 3 as far as upstream of the first isolation valve 5a.

As an alternative or as a supplement to the first isolation valve 5a, the leak detector 1 can comprise a second isolation valve 5b fitted to the bypass line 3b, after the intersection I, upstream of the device for detection of the tracer gas 6. The second isolation valve 5b makes it possible to isolate the device 6 for detection of tracer gas, in particular in order to protect the latter from possible contaminations on shutting down the leak detector 1, when the pumping device 4 is halted.

The device 6 for detection of tracer gas comprises a probe 12 and a separating membrane 8 arranged upstream of the probe 12 in the direction of flow of the gases. The device 6 for detection of tracer gas does not exhibit an outlet for gases; it is closed at one end in the form of a "cul-de-sac".

The separating membrane 8 is, for example, arranged in a cylindrical line coupling 7 which can be connected as bypass of the pumping line 3. When the leak detector 1 comprises a second isolation valve 5b, the line coupling 7 can be connected to a bypass line 3b downstream of the second isolation valve 5b.

The separating membrane 8 can thus be brought together with the gases sucked off by the pumping device 4 in the pumping line 3 when the second isolation valve 5b is open.

The section for passage of the gases is leaktight around the separating membrane 8, so that only the gas which can pass through the separating membrane 8 can reach the probe 12.

The probe 12 is configured in order to ionize the gas molecules and to measure the ionic current of the ionized gas molecules by converting it into electric current. As will be seen later, for this purpose the probe 12 comprises, for example, an ionization gauge or an ion pump.

The electric current is representative of the amount of ionized molecules of the probe 12. It can be processed/amplified/displayed by a device for displaying and/or processing the signal 14.

Provision is made in addition for the separating membrane 8 to be fitted directly to the probe 12 so that the volume between the probe 12 and the separating membrane 8 is a small as possible.

More visible in FIGS. 4 to 6, the separating membrane 8 is a monoatomic layer of graphene 9 in which a plurality of selection orifices 10 is made.

Graphene is a two-dimensional (that is to say, monoplanar) carbon crystal, the empirical formula of which is $C_n$ and the crystal system of which is planar hexagonal, as visible in FIG. 6. Graphene thus consists of a monoatomic layer of carbon. The thickness of the monoatomic layer of graphene 9 is thus of the order of a few angstroms, such as 5 or 8 angstroms.

Graphene is an element which is leaktight to the main gases.

The greatest dimension D of a selection orifice 10 is less than 5 angstroms, such as less than 3 angstroms, so that only the gas molecules having smaller dimensions than the selection orifices 10 can pass through the separating membrane 8 to reach the probe 12.

The greatest dimension D of the selection orifice 10 is within the plane of the monoatomic layer of graphene 9 and can be denoted by the diameter of the selection orifice 10 substantially in the form of a disc (FIG. 6).

As the tracer gas is generally a gas, the atoms or the molecules of which are of very small dimensions, such as helium or hydrogen, only the molecules of the tracer gas can thus reach the probe 12.

Thus perforated, the monoatomic layer of graphene 9 becomes mechanically permeable to the molecules passing through the selection orifices 10. The dimensions of the selection orifices 10 make it possible for only the molecules of the tracer gas which it is desired to detect in the object to be tested A or in the leaktight test chamber C or around the object to be tested to pass through the separating membrane 8. The passage of the molecules of other gases, such as nitrogen or oxygen of the air, is blocked. The pressure downstream of the separating membrane 8 is then a low ultrahigh-vacuum pressure that is to say a high vacuum, for example of between $10^{-3}$ and $10^{-7}$ mbar, such as less than $10^{-5}$ mbar. This ultrahigh vacuum makes possible the operation of the probe 12 which ionizes the gas molecules.

As the thickness of the separating membrane 8 constituted by the monoatomic layer of graphene 9 is of the order of a few angstroms, the thickness is decreased by a factor of 1000 to 10 000 with respect to me thickness of the membranes made of polymer or of silica of the state of the art. The tracer gas thus passes through the separating membrane 8 virtually instantaneously, so that the response time is much faster than that of the membranes of the prior art.

As the permeation of the separating membrane 8 formed by the monoatomic layer of graphene 9 is mechanical, this does not have to be heated in order to allow the passage of the helium, which is simple to set up and is economical in terms of energy.

The selection orifices 10 are, for example, created by FIB (Focus Ion Beam).

The density of the selection orifices 10 is, for example, between $4.10^{15}$ cm$^{-2}$ and $4.10^{18}$ cm$^{-2}$.

For example, the selection orifices 10 are produced in the monoatomic layer of graphene 9 by means of a beam of gallium ions, which makes it possible to obtain a density of between $4.10^{15}$ cm$^{-2}$ and $2.10^{16}$ cm$^{-2}$, or by means of a beam of helium ions, which makes it possible to obtain a density of between $5.10^{17}$ cm$^{-2}$ and $4.10^{18}$ cm$^{-2}$.

These selection orifices 10 are, for example, uniformly distributed in the monoatomic layer of graphene 9.

These manufacturing techniques make it possible to manage the dimensions and the density of the selection orifices 10 created in the monoatomic layer of graphene 9, which makes it possible to control the measurement sensitivity of the device 6 for detection of tracer gas.

Provision is made, in addition, for the device 6 for detection of tracer gas to comprise a gas-permeable substrate 11 in order to support the monoatomic layer of graphene 9.

The gas-permeable substrate 11 is non-selective as it allows the majority of gaseous entities to pass without selection.

For this, the gas-permeable substrate 11 comprises a material having through-pores of large dimensions with respect to the dimensions of the selection orifices 10, rendering it non-selective to the gases. The smallest dimension of a through-pore section can be greater than 30 angstroms, such as greater than 40 angstroms, and can be less than 200 angstroms.

The monoatomic layer of graphene 9 is deposited on the gas-permeable substrate 11, for example by a CVD (Chemical Vapour Deposition) process.

The monoatomic layer of graphene 9 deposited on the gas-permeable substrate 11 makes it possible for the device 6 for detection of tracer gas to be able to be placed under vacuum without tearing or damaging the monoatomic layer of graphene 9. This is because, in order to be able to detect a leak, the size and the density of the selection orifices 10 are dimensioned in order to allow only a minuscule stream of tracer gas to pass, which also has the effect of creating a significant difference in pressure on either side of the monoatomic layer of graphene 9. The pressure upstream of the layer 9 can be a low-vacuum pressure, whereas, downstream, the pressure can be an ultrahigh-vacuum pressure. The monoatomic layer of graphene 9 deposited on the gas-permeable substrate 11 makes it possible to confer the necessary stiffness on the monoatomic layer of graphene 9 in order for the latter to be able to be held uniformly and without deformations over its entire surface, despite this significant difference in pressure.

The gas-permeable substrate 11 is, for example, arranged on the back of the monoatomic layer of graphene 9 downstream of the monoatomic layer of graphene 9. It is thus located between the monoatomic layer of graphene 9 and the probe 12 in the direction of flow of the gases, so that all the gas liable to pass through the gas-permeable substrate 11 first passes through the monoatomic layer of graphene 9.

Conversely, the as-permeable substrate 11 can be arranged at the front, upstream of the monoatomic layer of graphene 9. The gas stream then first passes through the gas-permeable substrate 11, before reaching the monoatomic layer of graphene 9. The gas-permeable substrate 11 can then act as particle filter, preventing bulky liquid or solid particles from passing through the pores of the gas-permeable substrate 11, even when the gas-permeable substrate 11 exhibits through-pore sections of the order of 200 angstroms. Contamination of the monoatomic layer of graphene 9 by solid or liquid contaminants, such as water or organic contaminants, is thus prevented.

The gas-permeable substrate 11 comprises, for example, a porous ceramic or a porous silica-based material. The gas-permeable substrate 11 can be glass, such as Vycor®, comprising approximately 96% of silica and 4% of boric anhydride. These materials make it possible for the gas-permeable substrate 11 to be able to be produced with a low thickness e, such as between 1 and 100 µm, which makes it possible to reduce the response time per measurement.

The gas-permeable substrate 11 does not trap the molecules of tracer gas in its pores when it passes through the separating membrane 8. The tracer gas can thus easily pass through the gas-permeable substrate 11 to reach the separating membrane 8 and can be easily discharged from the gas-permeable substrate 11 once the measurement has been carried out.

The monoatomic layer of graphene 9 and the gas-permeable substrate 11 can exhibit any shape, such as a disc shape or a rectangular shape.

The monoatomic layer of graphene 9 exhibits, for example, a surface area of between 0.5 and 2 $cm^2$, such as of the order of 1 $cm^2$, the monoatomic layer of graphene 9 having to entirely cover the surface of the gas-permeable substrate 11 in order for the carrier gas to be able to be separated from the gas stream F by the monoatomic layer of graphene 9.

According to an exemplary embodiment, the probe 12 comprises an ionization gauge (or ionization manometer), such as a cold cathode ionization gauge, for example a Penning gauge, or such as a hot cathode ionization gauge.

In a way known per se, the cold cathode ionization gauge comprises two electrodes separate from one another, between which a potential difference of the order of several thousand volts is applied. The gas between the electrodes is ionized and a fraction reaches the anode, where it remains attached, creating an electric current. The ionization gauge can comprise a device for generation of a magnetic field in order to guide the ions. The measurement of the ionization current is thus representative of the gas which has passed through the separating membrane 8.

The hot cathode ionization gauge or "triode gauge" comprises three electrodes, forming a triode, the cathode of which is an incandescent filament. The three electrodes form an ion collector, a filament and an accelerating grid. In operation, the filament, brought to high temperature, emits electrons which oscillate around the grid and end up by accumulating there. During these oscillations, a few electrons collide with gas molecules and ionize them. The number of ions is proportional to the density of the gas molecules and to the stream of electrons emitted by the filament. These ions accumulate on the collector to form an ionic current. This current is proportional to the density of the gas molecules and thus to the pressure.

According to another example, the probe 12 comprises an ion pump.

The principle of the ion pump is the same as that of the ionization gauge. Like the ionization gauge, the ion pump ionizes the gas molecules, which are subsequently attached by a surface of the pump by the action of electric fields, possibly in combination with a magnetic field. The measurement of the ionic current is representative of the amount of gas. The ion pump is a capture pump which can be a getter pump, a sublimation pump, a spraying pump or a combination of these principles.

It is understood that the probe 12, which makes it possible to ionize the gases which have passed through the separating membrane 8 in order to quantify an ionic current representative of the tracer gas found in the object to be tested A or the leaktight test chamber C or in the atmosphere surrounding the object to be tested A, is reliable, relatively inexpensive, simple to employ and robust.

The method for detecting leaks for the detection of leaks from an object to be tested A by detection of a tracer gas by means of the leak detector 1 will now be described.

The first and second isolation valves 5a, 5b are open and the pumping device 4 is in operation. The pumping line 3 and the bypass line 3b are under a low low-vacuum pressure.

According to a first method, "by spraying", represented in FIG. 1, the object to be tested A is connected to the inlet 2 of the gases of the leak detector 1, placing the internal atmosphere of the object to be tested A under a low low-vacuum pressure. The object to be tested A is sprinkled with a tracer gas, such as helium or hydrogen.

According to a second method represented in FIG. 2, the object to be tested A is filed with the tracer gas and pieced in a leaktight test chamber C connected to the inlet 2 of the gases of the leak detector 1 placing the internal atmosphere of the leaktight test chamber C under a low low-vacuum pressure.

According to a third method represented in FIG. 3, the sniffing probe 15 is connected to the inlet 2 of the gases of the leak detector 1. The object to be tested A is filled with the tracer gas and placed close to the end of the pipe 18 of the sniffing probe 15.

In these three cases, a gas stream F, containing tracer gas in the event of leaks from the object to be tested A, thus moves from the inlet 2 of the gases towards the pumping device 4.

The gas stream F flowing in the pumping line 3 is in fluidic communication with the separating membrane 8.

The pierced monoatomic layer of graphene 9 allows only the passage of the molecules of tracer gas, the dimensions of which are less than the greatest dimensions D of the selection orifices 10 of the monoatomic layer of graphene 9, and blocks the passage of other gases, such as nitrogen or oxygen of the air, which are discharged in the pumping line 3 towards the pumping device 4.

The gases which have passed through the separating membrane 8 are ionized in order to generate a current representative of the leakage rate of the object to be tested A and thus of the leakage rate of the object to be tested A. The current can be amplified, processed and/or displayed by a device for displaying and/or processing the signal 14. This signal thus makes it possible to detect a leak and to quantify the leakage rate of the object to be tested A, with a good detection sensitivity, such as less than $10^{-5}$ mbar·l/s, indeed even $10^{-7}$ mbar·l/s.

The detector 1 is thus simple, economical, light, easy to maintain and robust vis-à-vis impacts or vis-à-vis the surrounding atmosphere because it does not require the use of a high vacuum by ultrahigh-vacuum pumping of turbomolecular type.

In addition, it does not need to be powered or heated; it thus consumes very little energy.

In addition, it makes it possible to obtain a measurement with a very short reaction time and without a waiting time between two successive measurements, given that the separating membrane 8 exhibits a high rate of permeation.

The invention claimed is:

1. A leak detector for detection of leaks from an object to be tested by detection of a tracer gas, the leak detector comprising:
    an inlet of gases;
    a pumping device;
    a pumping line connecting the inlet of the gases to the pumping device; and
    a device configured to detect the tracer gas, being fitted to the pumping line, as a bypass of the pumping device, the device comprising:
        a probe configured to ionize gas molecules and to measure a current of the ionized gas molecules under a vacuum, and
        a separating membrane arranged upstream of the probe, wherein the separating membrane
            is a monoatomic layer of graphene deposited directly on a gas-permeable substrate of the device by chemical vapor deposition, such that the monoatomic layer of graphene is held, uniformly and without deformations over an entire surface thereof, by the gas-permeable substrate, and
        includes selection orifices in the monoatomic layer of graphene, a greatest dimension of which is less than 5 angstroms, disposed in the deposited monoatomic layer of graphene so that only gas molecules having smaller dimensions than that of the selection orifices can pass through the separating membrane to reach the probe.

2. The leak detector according to claim 1, wherein a greatest dimension of the selection orifices is less than 3 angstroms.

3. The leak detector according to claim 1, wherein a density of the selection orifices is between $4 \cdot 10^{15}$ cm$^{-2}$ and $4 \cdot 10^{18}$ cm$^{-2}$.

4. The leak detector according to claim 1, wherein the monoatomic layer of graphene exhibits a surface area of between 0.5 cm$^2$ and 2 cm$^2$.

5. The leak detector according to claim 1, wherein the gas-permeable substrate comprises a material having through-pores, a smallest dimension of a through-pore section being greater than 30 angstroms.

6. The leak detector according to claim 1, wherein a thickness of the gas-permeable substrate is between 1 μm and 100 μm.

7. The leak detector according to claim 1, wherein the probe comprises an ionization gauge or an ion pump.

8. The leak detector according to claim 1, further comprising a sniffing probe connected to the inlet of the gases.

9. A method for detecting leaks from an object to be tested by detection of a tracer gas, by a leak detector according to claim 1, the method comprising:
    a gas stream moving from an inlet of the gases towards a pumping device, for which it is desired to detect whether it contains tracer gas in the event of leaks from the object to be tested, is brought into communication with a separating membrane of monoatomic layer of graphene deposited on a gas-permeable substrate; and
    the monoatomic layer of graphene being pierced with selection orifices, allowing passage only of gas molecules having dimensions less than a greatest dimension of the selection orifices of the monoatomic layer of graphene, and blocking passage of other gases.

10. The method for detecting leaks according to claim 9, wherein gases that have passed through the separating membrane are subsequently ionized to generate a current representative of a leakage rate of the object to be tested.

11. The leak detector according to claim 1, wherein the gas-permeable substrate is disposed upstream of the monoatomic layer of graphene, such that the gas-permeable membrane is a filter that prevents contaminants from reaching the monoatomic layer of graphene.

* * * * *